(12) United States Patent
Hagihara et al.

(10) Patent No.: US 11,828,026 B2
(45) Date of Patent: Nov. 28, 2023

(54) BASE SHEET FOR TOTAL HEAT EXCHANGER ELEMENT

(71) Applicant: Oji Holdings Corporation, Tokyo (JP)

(72) Inventors: Koichi Hagihara, Tokyp (JP); Yusuke Ikematsu, Tokyo (JP)

(73) Assignee: Oji Holdings Corporation, Tokyo (JP)

( * ) Notice: Subject to any disclaimer, the term of this patent is extended or adjusted under 35 U.S.C. 154(b) by 124 days.

(21) Appl. No.: 16/966,206

(22) PCT Filed: Jan. 29, 2019

(86) PCT No.: PCT/JP2019/002885
§ 371 (c)(1),
(2) Date: Nov. 10, 2020

(87) PCT Pub. No.: WO2019/151211
PCT Pub. Date: Aug. 8, 2019

(65) Prior Publication Data
US 2022/0178077 A1    Jun. 9, 2022

(30) Foreign Application Priority Data
Jan. 31, 2018    (JP) .................. 2018-014505

(51) Int. Cl.
| C09K 5/14 | (2006.01) |
| D21H 11/04 | (2006.01) |
| D21H 21/16 | (2006.01) |
| D21H 27/00 | (2006.01) |
| D21H 17/66 | (2006.01) |

(52) U.S. Cl.
CPC .............. *D21H 17/66* (2013.01); *C09K 5/14* (2013.01); *D21H 11/04* (2013.01); *D21H 21/16* (2013.01); *D21H 27/00* (2013.01)

(58) Field of Classification Search
CPC ........ D21H 17/66; D21H 11/04; D21H 21/16; D21H 27/00; C09K 5/14
See application file for complete search history.

(56) References Cited

U.S. PATENT DOCUMENTS

| 3,956,538 | A * | 5/1976 | Vartiak ................ C09K 21/02 428/17 |
| 11,607,570 | B2 * | 3/2023 | Hulbert et al. ........ A62C 3/0228 |
| 2013/0233529 | A1 * | 9/2013 | Harada .................. D21H 27/00 165/185 |
| 2016/0177512 | A1 * | 6/2016 | Kawahara ............. D21H 17/08 162/158 |
| 2016/0237620 | A1 * | 8/2016 | Takeda ................... D21H 27/30 |
| 2016/0252269 | A1 * | 9/2016 | Takeda ................. F28F 21/066 165/166 |
| 2017/0030657 | A1 * | 2/2017 | Omori .................. B32B 29/005 |
| 2019/0153321 | A1 * | 5/2019 | Simonovic ............. D21H 7/68 |
| 2019/0257032 | A1 * | 8/2019 | Kawahara ............ D21H 19/34 |
| 2021/0010765 | A1 * | 1/2021 | Hamasaki ............. D21H 17/11 |
| 2022/0178077 | A1 * | 6/2022 | Hagihara ............... D21H 21/16 |

FOREIGN PATENT DOCUMENTS

| CN | 1958948 A * | 5/2007 | |
| EP | 3748078 A1 * | 12/2020 | ............... C09K 5/14 |
| EP | 3779348 A1 * | 2/2021 | ............... C09K 5/14 |
| GB | 2125076 A * | 2/1984 | ............. C09K 21/04 |
| JP | H10212691 A | 8/1998 | |
| JP | 2007119969 A * | 5/2007 | |
| JP | 2007119969 A | 5/2007 | |
| JP | 004736718 B2 | 7/2011 | |
| JP | 2016029226 A | 3/2016 | |
| JP | 2016108704 A | 6/2016 | |
| JP | 2017150802 A | 8/2017 | |
| JP | 2017179613 A * | 10/2017 | |
| JP | 2017179613 A | 10/2017 | |
| WO | WO 02/099193 A1 | 12/2002 | |
| WO | WO 2018/003492 A1 | 1/2018 | |
| WO | WO-2019099380 A1 * | 5/2019 | ............... B27N 1/00 |

OTHER PUBLICATIONS

Machine Translation of JP-2017179613. (Year: 2017).*
Machine Translation of JP-2007119969. (Year: 2007).*
Translation of Decision to Reject Chinese Application No. 201980011240.2, dated Mar. 11, 2023.
English translation of portion described at p. 33 in the Decision to Reject Application No. CN201980011240.2, dated Mar. 11, 2023.

* cited by examiner

*Primary Examiner* — Jose A Fortuna
(74) *Attorney, Agent, or Firm* — The Marbury Law Group, PLLC

(57) ABSTRACT

The object of the present invention is to provide a base sheet for a total heat exchanger element such that the base sheet has a high moisture permeability and an appropriate rate of moisture absorption as well as excels in flame resistance and gas barrier properties while its basis weight is low. A base sheet for a total heat exchanger element comprising calcium chloride in a paper base material, characterized in that the paper base material comprises pulp with a freeness of from 200 to 600 ml as measured in accordance with JIS P 8121 except that a pulp collection amount is set to 0.3 g/L; the paper base material has a bone-dry basis weight of from 17 $g/m^2$ to less than 23 $g/m^2$; and content of the calcium chloride is from 6 $g/m^2$ to less than 9 $g/m^2$.

12 Claims, No Drawings

BASE SHEET FOR TOTAL HEAT EXCHANGER ELEMENT

CROSS-REFERENCE TO RELATED APPLICATIONS

This application is a national phase application of international application PCT/JP2019/002885, filed Jan. 19, 2019, which claims the benefit of priority to Japanese Application No. 2018-014505, filed on Jan. 31, 2018, both of which are incorporated herein in their entireties.

TECHNICAL FIELD

The present invention relates to a base sheet for a total heat exchanger element.

BACKGROUND ART

Conventionally, a heat exchange ventilation device (heat exchanger) that can exchange heat between supplied air and discharged air at the time of ventilation has been disclosed as a device that can perform ventilation without impairing effects of cooling and heating operations. As such a heat exchanger, widely used are those having a total heat exchanger element (hereinafter, sometimes referred to as an element). This element is configured such that a plurality of partition plates (liners) are layered via spacers to partition between an air supply passage, through which outdoor air is introduced indoor, and an air discharge passage, through which indoor air is discharged outdoor.

A liner part of the total heat exchanger element can be used to exchange sensible heat (temperature) and latent heat (humidity) at the same time and needs to have both heat transfer property and moisture permeability. Accordingly, paper including natural pulp as a main component has been used in many cases.

Further, a base sheet used in the total heat exchanger element, in particular, a base sheet used for the liner part requires, in addition to the heat transfer property and the moisture permeability, increased heat resistance (flame resistance) and gas barrier properties (mainly $CO_2$ barrier property) so as not to mix supplied air and discharged air through the liner.

Thus, the following conventional technologies are disclosed to examine how each desiccant and/or flame retardant such as calcium chloride is blended in a base sheet for a total heat exchanger element.

For instance, Japanese Patent Application Publication No. 10-212691 describes that to increase moisture absorbing/releasing performance, moisture absorbing/releasing powder (e.g., silica gel, alumina) is blended.

WO2002/099193 describes that a highly beaten raw material is used to obtain a base sheet with excellent gas barrier properties.

Japanese Patent No. 4736718 describes that a prescribed amount of calcium chloride is included in a paper base material to prepare a total heat exchanger element-use base sheet having increased flame resistance and gas/$CO_2$ barrier properties.

SUMMARY OF INVENTION

Problems to be Solved by the Invention

As mentioned above, a base sheet for a total heat exchanger element should be configured to have both flame resistance and high heat exchanging efficiency. To increase the heat exchanging efficiency, it has been examined how each desiccant and/or moisture absorbing/releasing powder is blended. However, a blending formulation having well-balanced flame resistance and heat exchanging efficiency as well as, for instance, favorably balanced productivity and cost and having high moisture permeability has not been established.

Specifically, when calcium chloride, which has been commonly used as a desiccant or a flame protecting agent, is used, rust is likely to occur in equipment (equipment, such as a paper machine, a calender, or a winder, which is used in a step of producing a base sheet for a total heat exchanger element and in an element processing step). In addition, if a large amount of calcium chloride is added to a paper base material so as to, for instance, improve flame resistance, the amount of moisture absorbed under, in particular, a high-temperature and high-humidity atmosphere becomes excessive. This results in a problem of causing liquid sagging due to occurrence of dew condensation.

There are many techniques using, for instance, an organic acid salt or inorganic particles as a desiccant other than calcium chloride. However, according to such techniques, a flame protecting agent should be additionally added so as to impart flame resistance. This results in a problem in the aspects of productivity and cost. In addition, like WO2002/099193, disclosed is a technology in which a base sheet is increasingly beaten to give an element-use base sheet having excellent gas barrier properties. Unfortunately, if a base sheet has a high beating degree, not only the production efficiency in paper making decreases, but the resulting base sheet also becomes fragile. This may cause a problem at the time of producing the element. Further, like Japanese Patent No. 4736718, disclosed is a technology for obtaining flame resistance and increased gas barrier properties by applying a coating of calcium chloride. However, any base sheet having a moisture permeability of more than 2500 $g/m^2 \cdot 24$ h has not been obtained.

Furthermore, reducing the basis weight and thickness of the base sheet can reduce the weight of the element and increase the number of layers of the element without increasing the size of the element. Therefore, the reduction of the basis weight and the thickness of the base sheet effectively improves the heat exchange efficiency. Hence, there is a high demand for making the basis weight of a base sheet for a total heat exchanger element low and the thickness thin while the performance is kept.

The present invention has been made in view of the above situations. Specifically, the object of the present invention is to provide a base sheet for a total heat exchanger element such that the base sheet has a high moisture permeability and an appropriate rate of moisture absorption as well as excels in flame resistance and gas barrier properties while its basis weight is low.

Means for Solving the Problem

The present inventors have conducted intensive research to solve the above problems and, as a result, have found that when the freeness of a paper base material is set to be within a specific range and the content of calcium chloride is controlled to be within a prescribed range, the above problems can be resolved while the basis weight is low. In this way, the present invention has been completed. Specifically, the invention has the following configurations.

(1) A base sheet for a total heat exchanger element comprising calcium chloride in a paper base material, characterized in that the paper base material comprises pulp with a freeness of from 200 to 600 ml as measured in accordance with JIS P 8121 except that a pulp collection amount is set to 0.3 g/L; the paper base material has a bone-dry basis weight of from 17 g/m$^2$ to less than 23 g/m$^2$; and content of the calcium chloride is from 6 g/m$^2$ to less than 9 g/m$^2$.

(2) The base sheet for a total heat exchanger element according to (1), wherein the base sheet has a thickness of 40 μm or less.

(3) The base sheet for a total heat exchanger element according to (1) or (2), wherein the base sheet has a density of from 0.9 to 1.2 g/cm$^3$.

(4) The base sheet for a total heat exchanger element according to any one of (1) to (3), wherein moisture permeability at a temperature of 20° C. and a relative humidity of 65% is 2600 g/m$^2$·24 h or higher.

(5) The base sheet for a total heat exchanger element according to any one of (1) to (4), wherein a percentage of needle-leaved tree bleached kraft pulp with respect to the pulp is 80 mass % or higher.

(6) The base sheet for a total heat exchanger element according to any one of (1) to (5), further comprising 0.0001 g/m$^2$ or more of a blocking inhibitor containing wax selected from polyethylene-based wax, zinc stearate, polyethylene-based emulsified wax, oxidized polyethylene-based wax, or paraffin wax.

Advantageous Effects of Invention

Any base sheet for a total heat exchanger element according to the invention has a high moisture permeability and an appropriate rate of moisture absorption as well as excels in flame resistance and gas barrier properties while its basis weight is low.

DESCRIPTION OF EMBODIMENTS

A prescribed amount of calcium chloride is included in a given paper base material for a base sheet for a total heat exchanger element according to the invention (hereinafter, sometimes referred to as a "base sheet for an element"). Hereinbelow, each member as a component of the base sheet for an element will be illustrated.

(Paper Base Material)

A paper base material in the invention primarily includes pulp. Examples of the kind of pulp used as a raw material for the paper base material include wood pulp such as needle-leaved tree bleached kraft pulp (NBKP), needle-leaved tree kraft pulp (NKP), broad-leaved tree bleached kraft pulp (LBKP), broad-leaved tree kraft pulp (LKP), groundwood pulp (GP), thermomechanical pulp (TMP), chemi-thermo-mechanical pulp (CTMP), or deinked pulp (DIP). The pulp may be used singly, or two or more kinds of the pulp may be used in combination. A digesting process and/or a bleaching process for the pulp are not particularly limited. Among the pulp kinds, needle-leaved tree bleached kraft pulp is preferably included so as to improve the strength of the base sheet and increase the effect of eliciting $CO_2$ barrier property, etc. The percentage of the needle-leaved tree bleached kraft pulp with respect to the pulp is preferably 80 mass % or higher and more preferably 100 mass %.

In addition to the wood pulp, it is possible to use non-wood pulp such as hemp pulp, kenaf, or bamboo. Further, it is possible to blend, as an auxiliary material, a material other than pulp fiber, such as rayon fiber, nylon fiber, or other thermally bonded fibers.

In the invention, the modified freeness of pulp constituting a paper base material is set to be within a range from 200 to 600 ml in order to make thinner the thickness of a base sheet for an element and to elicit the gas barrier properties. As used herein, the modified freeness means a freeness as measured in accordance with JIS P 8121-2:2012 except that the pulp collection amount is changed from the normal 3 g/L to 0.3 g/L. The modified freeness of pulp constituting a paper base material is preferably within a range from 350 to 500 ml.

If the modified freeness is within the above numerical range, it is possible to keep the base sheet for an element which has high levels of gas/$CO_2$ barrier properties and a practical mechanical strength, while the basis weight is low. If the modified freeness is less than 200 ml, beating for actual machine operation requires a considerable time and dewaterability during paper making deteriorates. This may cause a decrease in the operation efficiency. In addition, paper itself may become fragile. Meanwhile, if the modified freeness exceeds 600 ml, it may be difficult to elicit $CO_2$ barrier property while the thickness remains thin.

In a process for beating pulp used in an actual machine, the beating machine is not particularly limited and, for instance, a double disk refiner (DDR) having high beating efficiency is preferably used.

A pulp slurry obtained by beating may contain various additive chemicals for paper-making. Examples of the additive chemicals include a paper strength enhancer, a wet paper strength enhancer, aluminum sulfate, cationic starch, a variety of fixing agents. In addition, any filler and/or colorant may be blended. The base sheet for an element, in particular, is to be highly hygroscopic, so that it is preferable to blend a wet paper strength enhancer in view of keeping the strength.

The pulp slurry as so prepared is subject to paper making according to a usual procedure to produce a paper base material for a base sheet for an element in the invention.

The bone-dry basis weight of the paper base material is from 17 g/m$^2$ to less than 23 g/m$^2$ and preferably from 19 to 22 g/m$^2$. As used herein, the bone-dry basis weight of the paper base material is a basis weight after heating and drying in an oven at 105° C. for 2 h in accordance with JIS P 8127:2010. The lower basis weight enhances the heat exchanging efficiency, and thereby further increase the moisture permeability.

(Calcium Chloride)

Calcium chloride is included in the paper base material to prepare the base sheet for an element. Calcium chloride serves not only as a desiccant, but also as a flame protecting agent (flame retardant). Examples of another desiccant include lithium chloride, urea, carrageenan, alginic acid, or alginate, which may be optionally used in combination with calcium chloride.

Conventionally, a flame retardant, in addition to calcium chloride, is added so as to elicit flame resistance. However, in the invention, by appropriately controlling the content of calcium chloride, both flame resistance and high moisture permeability have successfully been established without blending an additional flame retardant.

The content of calcium chloride in the base sheet for an element is from 6 g/m$^2$ to less than 9 g/m$^2$ and preferably from 7 to 8 g/m$^2$. If the content of calcium chloride is within the above numerical range, it is possible to provide a base sheet for an element with an appropriate rate of moisture absorption and excellent flame resistance while the basis weight of the paper base material is low as described above. If the content of calcium chloride is less than 6 g/m$^2$, the moisture-absorbing performance is insufficient as well as the flame-protecting effect is not sufficiently elicited. In addition, if the content of calcium chloride exceeds 9 g/m², the rate of moisture absorption in the base sheet for an element becomes unnecessarily high and the volume of water retained is large. This causes a concern about occurrence of dew condensation under a high-temperature and high-humidity environment. Further, if the content of calcium chloride becomes unnecessarily large, there is a risk of easily generating rust during an operation step.

As used herein, the content of calcium chloride in the base sheet for an element can be calculated by the following equation using mass X obtained after drying the base sheet for an element and mass Y obtained by washing the base sheet for an element with running water to remove calcium chloride and then drying the base sheet for an element.

Content of calcium chloride (g/m²)=$X-Y$, where

X=Basis weight (g/m²) of a base sheet for an element (mass obtained after heating and drying in an oven at 120° C. for 10 min); and Y=Basis weight (g/m²) of the base sheet for an element after calcium chloride is washed out with water and removed (mass obtained after heating and drying in an oven at 120° C. for 10 min).

(Blocking Inhibitor)

Calcium chloride may be added to the paper base material to increase performance of retaining water in the paper base material. By doing so, blocking is likely to occur. This may result in a problem of detachment from a roll in each step during production. Because of this, it is preferable to include a blocking inhibitor in the base sheet for an element so as to prevent occurrence of the blocking and to rectify the detachment from a roll in each step during production.

As the blocking inhibitor, it is preferable to use a blocking inhibitor containing wax selected from polyethylene-based wax, zinc stearate, polyethylene-based emulsified wax, oxidized polyethylene-based wax, or paraffin wax. Examples of another blocking inhibitor include a silicone-based resin or a metal soap such as a higher fatty acid calcium salt. These blocking inhibitors may be used singly or may be used, if appropriate, in combination after compatibility with calcium chloride and an anti-blocking effect are taken into account.

To elicit the anti-blocking effect on the base sheet for an element, it is preferable to include 0.0001 g/m² or more of a blocking inhibitor in the base sheet for an element. Meanwhile, if the blocking inhibitor is included excessively in the base sheet for an element, contamination during a drying step may occur. Accordingly, the content of the blocking inhibitor is preferably 0.01 g/m² or less.

Examples of a process for including a blocking inhibitor in the base sheet for an element include a publicly known procedure such as a coating process, an impregnation process, or a spraying process, which may be selectively used, if appropriate. Among the processes, a coating process by an on-machine size press device is preferably used from the viewpoint of productivity, etc. This process is the same as "A process for including calcium chloride in the paper base material" described later in "Production Process". Specifically, an aqueous solution containing a blocking inhibitor in addition to calcium chloride is used in an on-machine size press device.

(Polymer Resin)

Inclusion of a polymer resin into the base sheet for an element makes it possible to further increase the gas barrier properties. Examples of the polymer resin used to increase the gas barrier properties include PVA, a water-soluble resin such as starch, a latex compound such as SBR, or an acrylic resin.

Examples of a process for including a polymer resin in the base sheet for an element include a publicly known procedure such as a coating process, an impregnation process, or a spraying process, which may be selectively used, if appropriate. Among the processes, a coating process by an on-machine size press device is preferably used from the viewpoint of productivity, etc. This process is the same as "A process for including calcium chloride in the paper base material" described later in "Production Process". Specifically, an aqueous solution containing a polymer resin in addition to calcium chloride is used in an on-machine size press device.

[Base Sheet for Element]

(Thickness)

The element-use base sheet with a thinner thickness is preferable from the viewpoints of heat exchanging efficiency and heat transfer efficiency. Specifically, it is more preferable that the base sheet for an element has a thickness of 40 μm or less.

(Density)

The element-use base sheet with a higher density is preferable because the heat exchanging efficiency is generally high. Specifically, the density of the base sheet for an element is preferably in a range from 0.9 to 1.2 g/cm³ and more preferably in a range from 1.05 to 1.15 g/cm³ from the viewpoints of heat exchanging efficiency and gas barrier properties.

(Basis Weight)

The element-use base sheet with a lower basis weight is preferable when the base sheet is assumed to have prescribed gas barrier properties. Specifically, the basis weight is preferably 40 g/m² or less and more preferably 37 g/m² or less. When the basis weight of the base sheet for an element is low, the element can be made lightweight. Further, it is possible to increase the number of layers for the element in the total heat exchanger. An increase in the number of layers in the element is effective in improving the heat exchanging efficiency.

(Moisture Permeability)

Moisture permeability is effective as an indicator for the moisture absorbing/releasing performance and heat exchanging efficiency of the base sheet for an element. The moisture permeability is measured in accordance with JIS Z 0208:1976. The specific measurement conditions for the moisture permeability are described in the below-described measurement protocols for Examples. The element-use base sheet with a larger numerical value for the moisture permeability is preferable because the larger numerical value means better heat exchanging efficiency. As a standard moisture permeability, the moisture permeability at a temperature of 20° C. and a relative humidity of 65% is preferably 2600 g/m²·24 h or higher and more preferably 3000 g/m²·24 h or higher.

As to the base sheet for an element in this embodiment, it is possible to achieve a moisture permeability of 2600 g/m²·24 h or higher and further 3000 g/m²·24 h or higher at a temperature of 20° C. and a relative humidity of 65%.

(Rate of Moisture Absorption)

The rate of moisture absorption in the base sheet for an element is preferably controlled within a range of from 31% to 40%. If the rate of moisture absorption in the base sheet for an element is less than 31%, the moisture permeability may decrease and the heat exchanging efficiency is thus insufficient. Meanwhile, if the rate of moisture absorption in the base sheet for an element exceeds 40%, there is a risk of dew condensation and/or liquid sagging.

The rate of moisture absorption can be calculated using the following equation:

Rate of moisture absorption (%)={($A-B$)/$B$}×100, where A=Mass of a sample (mass under conditions at 20° C. and 65% RH); and B=Bone-dry mass of the sample (mass after heating and drying in an oven at 105° C. for 2 h).

(Gas Barrier Properties)

The base sheet for an element should have sufficient gas barrier properties so as not to mix intake air and discharge air. Among the gas barrier properties, $CO_2$ barrier property is particularly important.

The gas barrier properties are correlated with air permeability (measured by an Oken air permeability test according to J.TAPPI-5). If the air permeability is 50 sec or more, the base sheet for an element has sufficient gas barrier properties and $CO_2$ barrier property. Thus, the base sheet for an element can be suitably used without conducting any additional processing such as coating.

[Production Process]

A process for including calcium chloride in the paper base material is not particularly limited. For instance, a calcium chloride aqueous solution may be used instead of water in an on-machine size press device or spray device of a paper machine. This makes it possible to include calcium chloride in the paper base material. In addition, it is possible to use a process in which an off-machine impregnation device is used to impregnate calcium chloride in the paper base material and the resulting material is then dried. When the operation performance and productivity are taken into consideration, it is preferable to use a process in which a calcium chloride aqueous solution is used for impregnation in an on-machine size press device.

Note that examples of the type of paper machine include, but are not particularly limited to, a long net paper machine or a short net paper machine. It is preferable to use a paper machine equipped with a size press device or impregnation device.

Note that depending on paper making equipment, there is a risk of occurrence of rust due to calcium chloride. Thus, it is preferable to blend the calcium chloride aqueous solution with a water-soluble anti-corrosive agent. The anti-corrosive agent is preferably selected from a non-nitrous-based one in light of environmental safety. In addition, the additive amount of the anti-corrosive agent with respect to the calcium chloride aqueous solution is not particularly limited and is preferably within a range from 0.5 to 5 mass % as the concentration in the aqueous solution.

In the step of producing the base sheet for an element, calcium chloride is added to the paper base material, preferably further followed by calendering. The calendering makes the density of the base sheet for an element high and causes a decrease in the thickness at the same time. As the density is made higher, the gas barrier properties improve. In addition, as the thickness decreases, the heat transfer efficiency increases. In this way, the effect of increasing the heat exchanging efficiency can be obtained.

To impart increased gas barrier properties to the base sheet for an element, it is possible to further apply a coating of polymer resin such as PVA as additional post-processing after the above-described calendering.

EXAMPLES

Hereinafter, Examples of the invention will be described. Note that unless otherwise indicated, "%" and "parts" in Examples and Comparative Examples indicate mass % and parts by mass, respectively.

Example 1

First, 100% needle-leaved tree bleached kraft pulp (NBKP) was beaten such that a modified freeness (where the pulp collection amount was 0.3 g/L) was 450 ml.

As additive chemicals, 0.5% polyacrylamide-based paper strength enhancer (Polystron 117, manufactured by Arakawa Chemical Industries, Ltd.), 0.5% polyamide/polyamine/epichlorohydrin-based wet paper strength enhancer (Arafix 255, manufactured by Arakawa Chemical Industries, Ltd.), and 0.5% aluminum sulfate with respect to the bone-dry pulp mass were added.

The resulting raw material was subjected to paper making by a long net paper machine, and was impregnated in a calcium chloride-containing size press liquid 1, described below, by on-machine size press. The resulting material was dried to prepare a paper base material. This paper base material was subjected to super-calendering to produce a base sheet for an element.

The bone-dry basis weight of the resulting paper base material was 20 g/m$^2$ and the amount of included calcium chloride was 6.5 g/m$^2$.

[Size Press Liquid 1]
Calcium chloride: 30%
Anti-corrosive agent: 2% (solid content)
Blocking inhibitor: 0.02% (solid content)

Example 2

The same procedure as in Example 1 was repeated, except that a size press liquid 2, described below, was used and the amount of included calcium chloride was 8 g/m$^2$, to produce a base sheet for an element.

[Size Press Liquid 2]
Calcium chloride: 35%
Anti-corrosive agent: 2% (solid content)
Blocking inhibitor: 0.02% (solid content)

Example 3

The same procedure as in Example 1 was repeated, except that the bone-dry basis weight of a paper base material was 22 g/m$^2$, to produce a base sheet for an element.

Example 4

The same procedure as in Example 1 was repeated, except that the 100% needle-leaved tree bleached kraft pulp (NBKP) was changed to 30% needle-leaved tree bleached kraft pulp (NBKP) and 70% broad-leaved tree bleached kraft pulp (LBKP), to produce a base sheet for an element.

Comparative Example 1

The same procedure as in Example 1 was repeated, except that the bone-dry basis weight of a paper base material was 35 g/m$^2$, to produce a base sheet for an element.

Comparative Example 2

The same procedure as in Example 1 was repeated, except that a size press liquid 3, described below, was used and the amount of calcium chloride coated was 2 g/m², to produce a base sheet for an element.
[Size Press Liquid 3]
Calcium chloride: 10%
Anti-corrosive agent: 2% (solid content)
Blocking inhibitor: 0.02% (solid content)

Comparative Example 3

The same procedure as in Example 1 was repeated, except that a size press liquid 4, described below, was used and the amount of calcium chloride coated was 11 g/m², to produce a base sheet for an element.
[Size Press Liquid 4]
Calcium chloride: 39%
Anti-corrosive agent: 2% (solid content)
Blocking inhibitor: 0.02% (solid content)

Comparative Example 4

The same procedure as in Example 1 was repeated, except that the bone-dry basis weight of a paper base material was 16 g/m², to produce a base sheet for an element.

Note that the anti-corrosive agent and the blocking inhibitor, which were used in the above Examples and Comparative Examples, were a non-nitrous-based anti-corrosive agent Metalex ANK (manufactured by YUKA SANGYO CO., LTD.) and polyethylene wax emulsion-based PEM-18 (manufactured by SAN NOPCO LIMITED), respectively.

Each base sheet for an element as obtained in the Examples and Comparative Examples was used as a sample and evaluated by the following protocols.

Table 1 shows the results.

[Evaluation Protocols]

1. Thickness of each base sheet for an element: measured in accordance with JIS P8118:2014.
2. Density: the basis weight of each base sheet for an element was measured (under conditions at 23° C.×50% RH) in accordance with JIS P8124:2011 and the thickness of the base sheet for an element was measured in accordance with JIS P8118:2014 to calculate the density.
3. Moisture permeability: measured under conditions at 20° C.×65% RH in accordance with JIS Z0208. In this regard, the following equation was used for the calculation.

$$\text{Moisture permeability} = (a+b)/2,$$

where a=Increase in mass at 1 h after the start of measurement; and
b=Increase in mass during 1 h from a time point at 1 h after the start of measurement to a time point at 2 h after the start of measurement.

4. Rate of moisture absorption: calculated using the following equation:

$$\text{Rate of moisture absorption (\%)} = \{(A-B)/B\}*100,$$

where A=Mass of a sample (mass under conditions at 20° C.×65% RH); and
B=Bone-dry mass of a sample (mass after heating and drying in an oven at 105° C. for 2 h).

5. Flame resistance: measured in accordance with JIS Z 2150 (flame resistance grades 1 to 3).
When the flame resistance was grade 1 or 2, the flame resistance was determined to be excellent.

6. Air permeability: measured by an Oken air permeability test according to J.TAPPI-5.

7. $CO_2$ barrier property: used was a measuring device including: a 12 cm×12 cm base sheet for an element, as a partition plate; a compartment A in which highly concentrated $CO_2$ was provided; and a compartment B for measuring the concentration of $CO_2$. $CO_2$ at 2000 ppm was contained under ambient temperature and ambient pressure conditions in the compartment A, which was left for 15 min. Then, the concentration of $CO_2$ in the compartment B was measured with a $CO_2$ analyzer. The amount of $CO_2$ passing through each base sheet for an element during 15 min was calculated as the concentration of $CO_2$ in the compartment B. When the concentration of $CO_2$ in the compartment B was 26 ppm or less, the $CO_2$ barrier property of the base sheet for an element was determined to be good.

TABLE 1

| | Bone-dry basis weight of paper base material (g/m²) | Content of calcium chloride (g/m²) | Thickness (μm) | Density (g/cm³) | Moisture permeability (g/m² · 24 h) | Rate of moisture absorption (%) | Flame resistance | Air permeability (sec) | $CO_2$ concentration (ppm) |
|---|---|---|---|---|---|---|---|---|---|
| Example 1 | 20 | 6.5 | 33 | 1.07 | 3400 | 35 | Grade 2 | 300 | 0.5 |
| Example 2 | 20 | 8 | 36 | 1.10 | 3500 | 39 | Grade 2 | 350 | 0.5 |
| Example 3 | 22 | 6.5 | 35 | 1.07 | 3300 | 34 | Grade 2 | 2000 | 0.4 |
| Example 4 | 22 | 6.5 | 38 | 0.99 | 2700 | 35 | Grade 2 | 1000 | 0.4 |
| Comparative Example 1 | 35 | 6.5 | 42 | 1.10 | 2300 | 26 | Grade 2 | 35000 | 0.2 |
| Comparative Example 2 | 20 | 2 | 29 | 1.01 | 1800 | 20 | Out of grade | 250 | 0.4 |
| Comparative Example 3 | 20 | 11 | 40 | 1.05 | 3400 | 46 | Grade 2 | 400 | 0.4 |
| Comparative Example 4 | 18 | 6.5 | 30 | 1.11 | 3400 | 38 | Grade 3 | 40 | 1.4 |

As evident from Table 1, a paper base material including given pulp was used for each base sheet for an element in Examples 1 to 4; the bone-dry basis weight of the paper base material was set to a predetermined numerical value; and the content of calcium chloride was set to be within a prescribed range. Any of them had a moisture permeability of 2600 g/m²·24 h or higher, an appropriate rate of moisture absorption, and grade 2 flame resistance. In addition, excellent gas barrier properties and $CO_2$ barrier property were successfully achieved.

The base sheet for an element in Comparative Example 1 had a large bone-dry basis weight of the paper base material and had a somewhat larger thickness. This caused the rate of moisture absorption to be smaller than the preferable range, and the moisture permeability was also small. The base sheet for an element in Comparative Example 2 had a small content of calcium chloride. As a result, the flame resistance was out of grade i.e. poor, the rate of moisture absorption was smaller than the preferable range, and the moisture permeability was also small. The base sheet for an element in Comparative Example 3 had a large content of calcium chloride and thus had a higher rate of moisture absorption, which may cause dew condensation and/or rust. The base sheet for an element in Comparative Example 4 had a small bone-dry basis weight of the paper base material and had poor flame resistance.

The invention claimed is:

1. A base sheet for a total heat exchanger element comprising calcium chloride in a paper base material, characterized in that the paper base material comprises pulp with a freeness of from 200 to 600 ml both inclusive as measured in accordance with JIS P 8121 except that a pulp collection amount is set to 0.3 g/L; the paper base material has a bone-dry basis weight of from 17 g/m² to less than 23 g/m²; content of the calcium chloride is from 6 g/m² to less than 9 g/m²; moisture permeability at a temperature of 20° C. and a relative humidity of 65% is 2600 g/m²·24 h or higher; the calcium chloride functions as a flame retardant and a desiccant; the base sheet is free of an additional flame retardant in addition to the calcium chloride; the base sheet is free of an additional desiccant in addition to the calcium chloride; the base sheet is free of a temperature control agent; flame resistance of the base sheet, measured in accordance with JIS Z 2150, is grade 1 or 2; and a rate of moisture absorption $(A_M)$ is from 31% to 40% both inclusive, wherein the rate of moisture absorption $(A_M)$ is a percentage calculated using the following equation:

$$A_M = \{(A-B)/B\} \times 100,$$

where A is a mass of a sample under conditions at 20° C. and 65% relative humidity; and B is a bone-dry mass of the sample after heating and drying in an oven at 105° C. for 2 hours.

2. The base sheet for a total heat exchanger element according to claim 1, wherein the base sheet has a thickness of 40 μm or less.

3. The base sheet for a total heat exchanger element according to claim 1, wherein the base sheet has a density of from 0.9 to 1.2 g/cm³ both inclusive.

4. The base sheet for a total heat exchanger element according to claim 1, wherein air permeability is 50 sec or more as measured in accordance with J.TAPPI-5.

5. The base sheet for a total heat exchanger element according to claim 1, wherein a percentage of needle-leaved tree bleached kraft pulp with respect to the pulp is 80 mass % or higher.

6. The base sheet for a total heat exchanger element according to claim 1, further comprising 0.0001 g/m² or more of a wax selected from the group consisting of polyethylene-based wax, zinc stearate, polyethylene-based emulsified wax, oxidized polyethylene-based wax, and paraffin wax.

7. The base sheet for a total heat exchanger element according to claim 1, wherein the bone-dry basis weight of the base sheet is from 20 g/m² to 22 g/m² both inclusive; the content of the calcium chloride is from 6.5 g/m² to 8 g/m² both inclusive; and the moisture permeability at a temperature of 20° C. and a relative humidity of 65% is from 2700 g/m²·24 h to 3500 g/m²·24 h both inclusive.

8. The base sheet for a total heat exchanger element according to claim 7, wherein the base sheet has a thickness of 40 μm or less.

9. The base sheet for a total heat exchanger element according to claim 7, wherein the base sheet has a density of from 0.9 to 1.2 g/cm³ both inclusive.

10. The base sheet for a total heat exchanger element according to claim 7, wherein air permeability is 50 sec or more as measured in accordance with J.TAPPI-5.

11. The base sheet for a total heat exchanger element according to claim 7, wherein a percentage of needle-leaved tree bleached kraft pulp with respect to the pulp is 80 mass % or higher.

12. The base sheet for a total heat exchanger element according to claim 7, further comprising 0.0001 g/m² or more of an anti-blocking agent containing wax of at least one selected from the group consisting of polyethylene-based wax, zinc stearate, polyethylene-based emulsified wax, oxidized polyethylene-based wax, and paraffin wax.

* * * * *